(12) United States Patent
Legg et al.

(10) Patent No.: US 9,326,289 B2
(45) Date of Patent: *Apr. 26, 2016

(54) METHOD AND APPARATUS FOR POWER CONTROL IN A RADIO COMMUNICATION SYSTEM

(71) Applicant: SONY CORPORATION, Minato-ku (JP)

(72) Inventors: Peter Jonathan Legg, Swindon (GB); Timothy J. Speight, Bristol (GB)

(73) Assignee: SONY CORPORATION, Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 13/716,742

(22) Filed: Dec. 17, 2012

(65) Prior Publication Data

US 2013/0128836 A1 May 23, 2013

Related U.S. Application Data

(63) Continuation of application No. 10/584,099, filed as application No. PCT/EP2004/053502 on Dec. 15, 2004, now Pat. No. 8,355,350.

(30) Foreign Application Priority Data

Dec. 23, 2003 (GB) .................................. 0329625.8

(51) Int. Cl.
*H04W 4/00* (2009.01)
*H04W 72/04* (2009.01)
(Continued)

(52) U.S. Cl.
CPC .......... *H04W 72/0473* (2013.01); *H04W 52/16* (2013.01); *H04W 52/322* (2013.01); *H04W 52/327* (2013.01)

(58) Field of Classification Search
None
See application file for complete search history.

(56) References Cited

U.S. PATENT DOCUMENTS 6,831,906 B2 12/2004 Malladi et al.
2001/0040880 A1 11/2001 Chen et al.
(Continued)

FOREIGN PATENT DOCUMENTS

EP    1 067 733 A1   1/2001
EP    1089458 A2    4/2001
(Continued)

OTHER PUBLICATIONS

Office Action issued Jul. 31, 2013 in European Patent Application No. 11 189 330.1.

(Continued)

*Primary Examiner* — Edan Orgad
*Assistant Examiner* — Rebecca Song
(74) *Attorney, Agent, or Firm* — Oblon, McClelland, Maier & Neustadt, L.L.P.

(57) ABSTRACT

Power control in a communication system (100) employing a Downlink Shared Control Channel (DSCH) and a Forward Access Control Channel (FACH) is described. The method includes, applying power control on the Downlink Shared Control Channel; deriving power control information from the power control on the Downlink Shared Control Channel; and applying to the Forward Access Control Channel the derived power control information from the power control on the Downlink Shared Control Channel in order to produce power control on the Forward Access Control Channel. The power control of the Forward Access Control Channel may be implemented by scheduling data in response to the derived power control information.

19 Claims, 8 Drawing Sheets

(51) Int. Cl.
*H04W 52/16* (2009.01)
*H04W 52/32* (2009.01)

(56) References Cited

U.S. PATENT DOCUMENTS

| | | | |
|---|---|---|---|
| 2002/0094833 | A1 | 7/2002 | Lieshout et al. |
| 2002/0098860 | A1* | 7/2002 | Pecen et al. ............... 455/522 |
| 2002/0115460 | A1* | 8/2002 | Rune et al. ................ 455/522 |
| 2002/0183086 | A1 | 12/2002 | Hellmark et al. |
| 2003/0022686 | A1* | 1/2003 | Soomro et al. ............. 455/522 |
| 2003/0027588 | A1 | 2/2003 | Futakata et al. |
| 2003/0039225 | A1* | 2/2003 | Casati et al. .............. 370/328 |
| 2003/0045317 | A1* | 3/2003 | Pan ..................... H04W 4/10 455/518 |
| 2003/0096635 | A1 | 5/2003 | Uehara et al. |
| 2003/0174686 | A1* | 9/2003 | Willenegger et al. ....... 370/342 |
| 2003/0210660 | A1* | 11/2003 | Wiberg et al. ............. 370/320 |
| 2004/0214590 | A1* | 10/2004 | Al-Housami et al. ....... 455/515 |

FOREIGN PATENT DOCUMENTS

| | | |
|---|---|---|
| EP | 1289328 A1 | 3/2003 |
| EP | 1 313 231 A1 | 5/2003 |
| GB | 2350522 A | 11/2000 |
| JP | 2002-503427 | 1/2002 |
| JP | 2002-290327 | 10/2002 |
| JP | 2003-503954 | 1/2003 |
| JP | 2003-46437 | 2/2003 |
| JP | 2003-23689 | 8/2003 |
| JP | 2003-298508 | 10/2003 |
| WO | WO 98/58461 | 12/1998 |
| WO | WO 0171926 A2 | 9/2001 |
| WO | WO 03/049320 A1 | 6/2003 |
| WO | WO 03096572 A2 | 11/2003 |

OTHER PUBLICATIONS

Japanese Office Action issued Oct. 19, 2010 in Japanese Application No. 2006-546160 (with English summary).
3GPP TS 25.214 V3.12.0 (2003-03), 3$^{rd}$ Generation Partnership Project; Technical Specification Group Radio Access Network; Physical layer procedures (FDD) (Release 1999), pp. 2-15/E.
Office Action issued Aug. 25, 2011 in European Patent Application No. 04 804 853.2.
"Power Control Enabled Transmission for MBMS", Samsung, 3GPP TSG RAN WG2 #37, Tdoc R2-031625, Aug. 25-29, 2003, 6 pages.
Extended European Search Report issued Jan. 24, 2012, in European Patent Application No. 11189330.1.
"3$^{rd}$ Generation Partnership Project; Technical Specification Group Radio Access Network; Physical layer Procedures (FDD) (Release 5)", 3GPP TS 25.214 V5.60, XP-050366852, Sep. 1, 2003, 63 pages.
Giridhar D. Mandyham, et al., "Packet Scheduling in CDMA Systems Based on Power Control Feedback", ICC 2001, vol. 9, XP-010553651, Jun. 11-14, 2001, pp. 2877-2881.
Daisuke Kitazawa, et al., "Downlink Packet-scheduling Considering Transmission Power and QoS in CDMA Packet Cellular Systems", Mobile and Wireless Communications Network, 2002, 4$^{th}$ International Workshop on Sep. 9-11, 2002, XP-010611843, pp. 183-187.
"3$^{rd}$ Generation Partnership Project; Technical Specification Group Radio Access Network; UTRAN Overall Description (Release 6)," (Sep. 2004), 3GPP:Valbonne, France, TS 25.401 v6.4.0:1-44.
"3$^{rd}$ Generation Partnership Project; Technical Specification Group Services and System Aspects; General Packet Radio Service (GPRS); Service Description; Stage 2 (Release 6)," (Sep. 2004), 3GPP:Valbonne, France, TS 23.060 v6.6.0:1-212.
"3$^{rd}$ Generation Partnership Project; Technical Specification Group Radio Access Network; Physical Channels and Mapping of Transport Channels onto Physical Channels (TDD) (Release 6)," (Jun. 2004), 3GPP:Valbonne, France, TS 25.221 v6.1.0:1-97.
"3$^{rd}$ Generation Partnership Project; Technical Specification Group Radio Access Network; Medium Access Control (MAC) Protocol Specification (Release 6)," (Jun. 2004), 3GPP:Valbonne, France, TS 25.321 v6.2.0:1-61.
"3$^{rd}$ Generation Partnership Project; Technical Specification Group Radio Access Network; Radio Resource Control (RRC); Protocol Specification (Release 6)," (Sep. 2004) 3GPP:Valbonne, France, TS 25.331 v6.3.0 1-1035.
Lucent Technologies, (Aug. 18-23, 2002), "MBMS Power Usage", 3GPP TSG RAN WG2 #31, R2-022110, Stockholm, Sweden, 4 pages.
Lucent Technologies, (Nov. 12-15, 2002), "Comparison of DSCH and FACH for MBMS", 3GPP TSG RAN2 WG#33, R3-023017, Sophia Antipolis, France, 4 pages.
Great Britain Search Report mailed May 26, 2004, for Great Britain Application No. 0329625.8 filed Dec. 23, 2003, 4 pages.
International Search Report and Written Opinion mailed May 4, 2005 for PCT Application No. PCT/EP2004/053502 filed Dec. 15, 2004, 11 pages.

* cited by examiner

METHOD AND APPARATUS FOR POWER CONTROL IN A RADIO COMMUNICATION SYSTEM

CROSS-REFERENCE TO RELATED APPLICATIONS

This application is a continuation of and is based upon and claims the benefit of priority under 35 U.S.C. §120 for U.S. Ser. No. 10/584,099, filed Jun. 7, 2007 the entire contents of which is incorporated herein by reference. U.S. Ser. No. 10/584,099 is a national stage of PCT/EP2004/053502, filed Dec. 15, 2004 and claims the benefit of priority under 35 U.S.C. §119 of United Kingdom Application No. 0329625.8, filed Dec. 23, 2003.

BACKGROUND OF THE INVENTION

1. Field of the Invention

This invention relates to communication systems and particularly (though not exclusively) to Time Division Duplex (TDD) operation in radio communication systems.

2. Description of the Related Art

In the field of this invention it is known that power management of Forward Access Channel (FACH) transport channels may be employed in a Universal Mobile Telecommunication System (UMTS) radio communication system.

In a $3^{rd}$ Generation Partnership Project (3GPP) radio communication system, the FACH is a common transport channel used for downlink transmissions. Data destined for a number of User Equipment units (UEs) may be mapped onto FACH(s). The FACHs are then multiplexed by the physical layer, mapped onto Coded Composite Transport Channels (CCTrCHs), and transmitted on Secondary Common Control Physical Channel (S-CCPCH) physical channels. UEs receive the S-CCPCH physical channels, extract the FACH(s) and identify data that is intended for them. Typically the data to be sent on the FACH(s) is rescheduled every Transmission Time Interval (TTI) (where TTI=10, 20, 40 or 80 ms).

The concept of applying power management on the FACH is known in the prior art. For example, in published US patent application no. US 2002/0094833 A1 it is known that the transmit power is regulated according to:
  UE Measurements
  received signal strength
  SIR (Signal to Interference Ratio)
  Error rates (Block Error Rate—BLER, Bit Error Rate—BER)
  Current Conditions in the Cell
  traffic volume
  % max BTS (percentage of maximum Base Transmitter Station) power in use.
  Service Requirements of the UE.

In document "MBMS Power Usage" (available from the 3GPP website at www.3gpp.org/ftp/tsg_ran/WG2_RL2/TSGR2_31/Docs/Zips/R2-022110.zip) and document "Comparison of DSCH and FACH for MBMS use" (available from the 3GPP website at www.3gpp.org/ftp/tsg_ran/WG2_RL2/TSGR2_31/Docs/Zips/R2-022110.zip) power control of the FACH has also been suggested in 3GPP for broadcast usage (MBMS, Multimedia Broadcast Multicast Service). Here the suggestion is made that if the network knows the geometry of the MBMS users in the cell, the transmission power can be set just enough to serve all users subscribing to the MBMS service instead of blindly using the power to cover the whole cell.

However, a disadvantage of these and similar prior art schemes is the difficulty of estimation of the power needs of individual UEs.

Furthermore, the required measurement and processing operations of the UEs result in increased complexity and increased communication of data over the air interface.

Also, a simple power control operation may not result in optimal resource usage in a communication system. Thus, conventional systems may have reduced capacity.

Hence, an improved method and apparatus for power control in a radio communication system would be advantageous and in particular a system wherein the abovementioned disadvantage(s) may be alleviated would be advantageous.

SUMMARY OF THE INVENTION

Accordingly, the Invention seeks to mitigate, alleviate or eliminate one or more of the above mentioned disadvantages singly or in any combination.

In accordance with a first aspect of the present invention there is provided a method for power control in a communication system employing a Downlink Shared Control Channel (DSCH) and a Forward Access Control Channel (FACH), comprising:

applying power control on the Downlink Shared Control Channel; deriving power control information from the power control on the Downlink Shared Control Channel; and applying to the Forward Access Control Channel the derived power control information from the power control on the Downlink Shared Control Channel in order to produce power control on the Forward Access Control Channel.

In accordance with a second aspect of the present invention there is provided an apparatus for power control in a communication system employing a Downlink Shared Control Channel (DSCH) and a Forward Access Control Channel (FACH), the apparatus comprising: means for applying power control on the Downlink Shared Control Channel; means for deriving power control information from the power control on the Downlink Shared Control Channel; and means for applying to the Forward Access Control Channel the derived power control information from the power control on the Downlink Shared Control Channel in order to produce power control on the Forward Access Control Channel.

The power control produced on the Forward Access Control Channel (FACH) may be produced directly by adjusting a transmit power for the FACH or may for example be produced indirectly by scheduling of data to be communicated on the FACH in response to the derived power control information from the power control on the Downlink Shared Control Channel.

Specifically, the applying to the Forward Access Control Channel the derived power control information from the power control on the Downlink Shared Control Channel in order to produce power control on the Forward Access Control Channel may be by applying to the Forward Access Control Channel the derived power control information from the power control on the Downlink Shared Control Channel in order to determine a power requirement for the Forward Access Control Channel.

The power requirement may be used to set a parameter for the transmission of the Forward Access Control Channel such as a transmit power or a scheduling of data.

The communication system may for example be a $3^{rd}$ Generation Cellular Communication System and may in particular be a 3GPP $3^{rd}$ Generation Cellular Communication System as defined in the Technical Specifications standardized by 3GPP.

These and other aspects, features and advantages of the invention will be apparent from and elucidated with reference to the embodiment(s) described hereinafter.

BRIEF DESCRIPTION OF THE DRAWINGS

One method and apparatus for power control in a radio communication system incorporating some embodiments of the present invention will now be described, by way of example only, with reference to the accompanying drawing(s), in which.

DETAILED DESCRIPTION OF THE PREFERRED EMBODIMENTS

Figure 1:
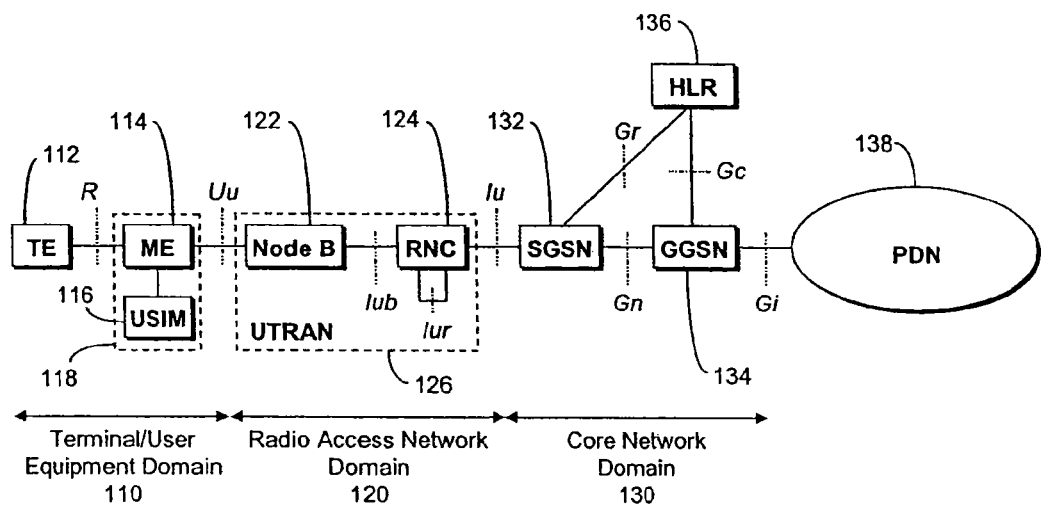
FIG. 1 shows a block schematic diagram illustrating a 3 GPP radio communication system in which the present invention may be used.

The following embodiment of the present invention will be described in the context of a UMTS Radio Access Network (UTRAN) system operating in TDD mode. Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and a Core Network domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as a user equipment (UE) 118. The UE 118 communicates data with a Node B (base station) 122 in the radio access network domain 120 via the wireless Uu interface. Within the radio access network domain 120, the Node B 122 communicates with a radio network controller (RNC) 124 via the Iub interface. The RNC 124 communicates with other RNC's (not shown) via the Iur interface. The Node B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node (GGSN) 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Thus, the elements RNC 124, SGSN 132 and GGSN 134 are conventionally provided as discrete and separate units (on their own respective software/hardware platforms) divided across the radio access network domain 120 and the core network domain 130, as shown in FIG. 1.

The RNC 124 is the UTRAN element responsible for the control and allocation of resources for numerous Node B's 122; typically 50 to 100 Node B's may be controlled by one RNC. The RNC also provides reliable delivery of user traffic over the air interfaces. RNC's communicate with each other (via the Iur interface) to support handover and macrodiversity.

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunnelling user data within the core packet network to the ultimate destination (e.g., internet service provider—ISP).

Such a UTRAN system and its operation are described more fully in the 3GPP technical specification documents 3GPP TS 25.401, 3GPP TS 23.060, and related documents, available from the 3GPP website at www.3gpp.org, and need not be described in more detail herein.

Figure 2:
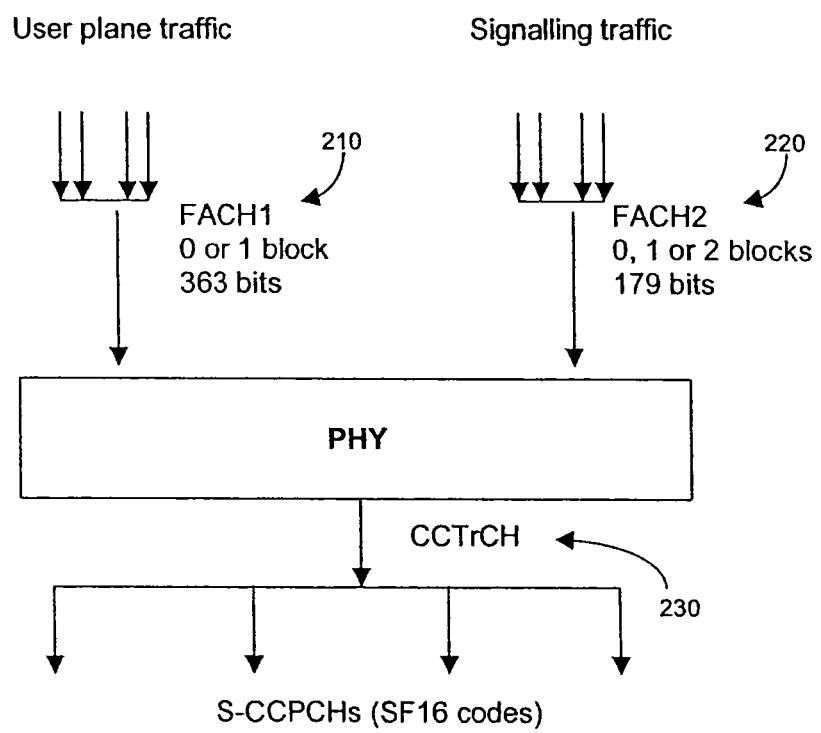
FIG. 2 shows a schematic diagram illustrating multiplexing of FACH transport channels onto a single CCTrCH.

FIG. 2 illustrates one use of the FACH. Here two FACH transport channels (FACH1, 210; FACH2, 220) are mapped to the same CCTrCH, 230, that is carried on a number of S-CCPCH physical channels. FACH1 carries either 0 or 1 user plane transport block, whilst FACH 2 carries either 0, 1 or 2 blocks of signalling traffic. Either a user plane block or 2 signalling blocks may be carried by the CCTrCH.

FACH2 is shared amongst all UEs, even during the same TTI. The UE, on receiving the S-CCPCH, identifies which signalling blocks are directed to itself by the UE ID field in the Medium Access Control (MAC) header (as described in 3GPP technical specification document 25.321, available from the 3GPP website) for the case of DCCH (Dedicated Control Channel) logical channel or by inspection of the UE ID within the RRC (Radio Resource Control) message for the case of CCCH (Common Control Channel) and SHCCH (Shared Control Channel).

To accommodate the variable rate of the CCTrCH, the number of physical codes is adjusted, and the Transport Format Combination Indicator (TFCI) carried on the physical channel is used to identify this choice (as described in 3GPP technical specification document 25.221, available from the 3GPP website).

Since the FACH is a common channel, the physical channels need to be transmitted with sufficient power such that all UEs targeted are able to decode the content. Typically the transmission has taken place at full power so that even if a UE at the cell edge is targeted, it would be able to decode the transmission (this is a worst case assumption). However, this is potentially wasteful of power if, for example, all the UEs targeted were to lie near the cell centre. Clearly, by only transmitting with sufficient power to satisfy the user with the greatest path loss from the basestation, power could be saved which may be exploited by other physical channels (not S-CCPCH). Furthermore, there is the alternative of scheduling more FACH blocks within the same (maximum) power.

Figure 3:
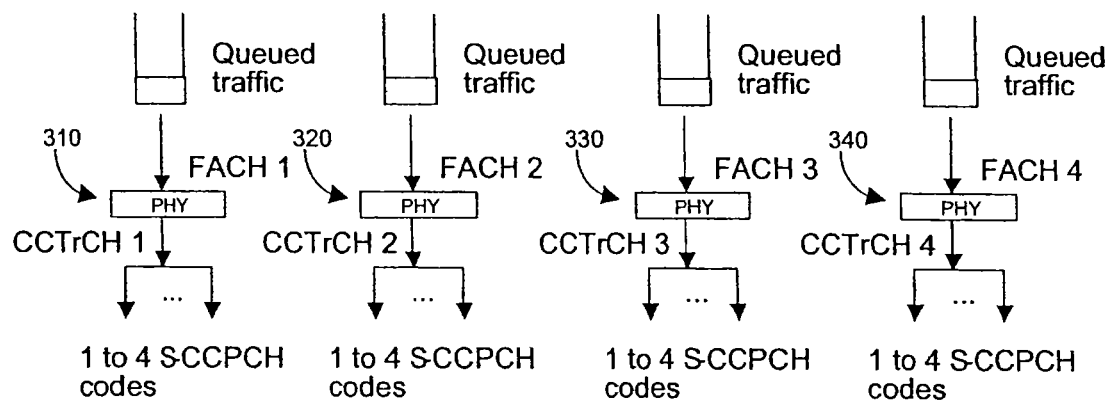
FIG. 3 shows a schematic diagram illustrating use of four CCTrCHs of S-CCPCH type to carry four FACHs.

FIG. 3 shows an alternative approach to using the FACH. Here four CCTrCHs (CCTrCH1, 310; CCTrCH2, 320; CCTrCH3, 330; CCTrCH4, 340), each of S-CCPCH type, are established, each supporting a single FACH. During a transmission a single FACH only carries traffic for a single UE. The UEs within the cell are subdivided into those that listen to CCTrCH1 only, those that listen to CCTrCH2 only, etc.

In this arrangement, without knowledge of the power requirements of different UEs the worst case must be assumed, where each FACH is carrying data to a UE at the extreme cell edge, and each CCTrCH consumes the corresponding power.

It is apparent that gains in throughput (or reductions in power consumption) are achievable if some form of power control can be introduced, whether a single S-CCPCH CCTrCH (as in FIG. 2) or many (as in FIG. 3) are employed. Furthermore, a reduced resource usage and thus increased capacity of the communication system as a whole may be achieved.

As will be explained in greater detail below, an important feature of some embodiments of the present invention is the use of power control to a UE on the downlink shared channel (DSCH) to determine the UEs power requirement on the FACH. The power requirement may be used for controlling any parameter or characteristic associated with the FACH. In particular, the power requirement may be used to provide power control directly by setting a transmission power of the FACH or indirectly by performing scheduling of data in response to the power requirement.

Figure 4:
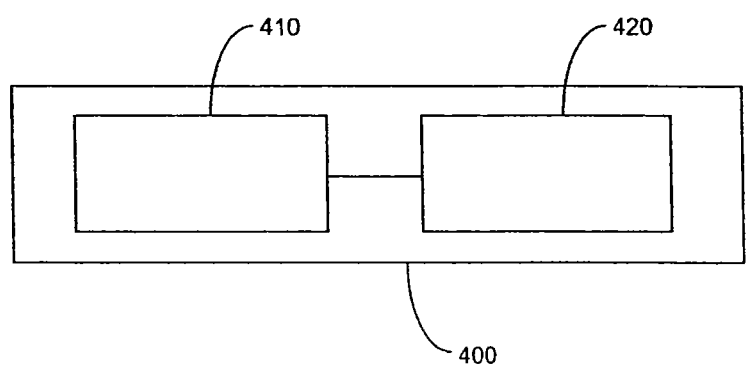
FIG. 4 shows a block schematic diagram illustrating an power control apparatus incorporating an embodiment of the present invention.

Referring now to FIG. 4, a power control apparatus 400 for implementing an embodiment of the present invention includes a module 410 for deriving DSCH power control information, and a module 420 for receiving the DSCH-derived power control information and for performing in dependence thereon FACH power control. Whilst not inapplicable for Frequency Division Duplex (FDD) operation, this scheme is particularly well suited to TDD operation. This is because in TDD the DSCH may be used in the same UE state as the FACH (this is called 'Cell FACH state') without the need to allocate dedicated resources (as described in 3GPP technical specification document 25.331, available from the 3GPP website). In other words, a UE can be served on the DSCH, power information can be extracted using the DSCH power control mechanism, and then the UE can be rapidly and easily served on the FACH, exploiting the power information gleaned from the DSCH operation. DSCH operation in Cell FACH state is not possible for FDD in a UMTS communication system; the UE must move to Cell DCH state where it is granted dedicated resource, in which it may receive DSCH (and FACH too, although this requires that the UE has the capability to decode three CCTrCHs at the same time).

The power control information of the DSCH may e.g. be obtained: directly from RNC power control entity (if RNC based power control), or indirectly from Node B power control entity (if TPC power control at the Node B). The power control on the FACH may e.g. be obtained in different ways including: via TFCS selection, scheduling of FACHs (number of codes/data rate) using a power management calculation based on the above, power cost calculation using C/I difference method, use of fixed or dynamically updated C/I values, or queueing and serving of UEs with similar power requirements on the FACH at the same time.

Figure 5:
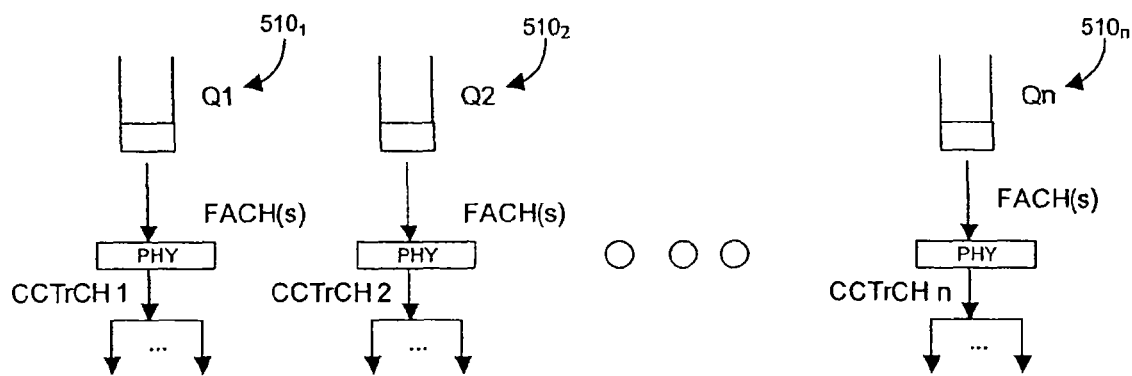
FIG. 5 shows a schematic diagram illustrating an arrangement of queued FACH traffic.

Referring now to FIG. 5, in one embodiment of the present invention the FACH blocks are queued in one of n queues $510_1$, $510_2$ . . . $510_n$, according to the CCTrCH that the targeted UE is listening to. Each CCTrCH may employ up to k, spreading factor 16 (SF16) codes. The code sets allotted to each CCTrCH are disjoint; the total number of codes over all CCTrCHs must be less than or equal to 16.

In some embodiments, power control may be produced for the FACH by scheduling FACH data in response to power requirements determined from the DSCH. For example, a FACH scheduler may determine a power requirement of FACH data and schedule data for transmission on the FACH until the combined power requirement exceeds a specified limit.

As an example, pseudo code for the operation of a FACH scheduler is given below. The key operation of the example is the calculation of the power cost of a CCTrCH when supporting a transport format combination (TFC). A TFC represents a particular combination of FACH blocks on the FACH transport channels of the CCTrCH. The power cost is defined as the fraction of the maximum transmit power of the basestation. To calculate the power cost, p, we calculate the difference of:

- the wanted signal divided by the level of noise+interference (C/I) at the UE j if it were to be served with the complete basestation power $C/I_{max,j}$ (this is determined from the DSCH power control to the UE), and
- the C/I required to support the TFC, $C/I_{TFC}$ where both quantities are measured in dB, i.e.:

$$p_{TFC,j} = 10^{(C/I_{max,j} - C/I_{TFC})/10}$$

It will be understood that, as used herein, the terms 'noise' and 'interference' are to be considered synonymous, with each encompassing both noise and interference, and that the term 'signal/interference' encompasses 'signal/(noise+interference)'.

Since FACH blocks may be scheduled from more than one UE onto the same CCTrCH, the power cost should be calculated assuming the worst case of the UEs scheduled, i.e., the UE with the smallest $C/I_{max,j}$.

```
Queue = start_queue      /* e.g. every run of the algorithm
                            we increment the start_queue by 1
                            (modulo n) */
    Do
        Do
            Take the next FACH transport block from
            'queue'
            Calculate TFC resulting from adding the
            block
            Calculate power cost for this CCTrCH
            carrying TFC
            Accept FACH block to schedule if
            cumulative power cost of all CCTrCHs <= 1
        While (cumulative power cost of all CCTrCHs <= 1 AND
        k_queue codes can take more blocks AND queue is not
        empty)
        Queue = (queue + 1)mod n      /* go to next queue */
    While (cumulative power cost of all CCTrCHs <= 1 AND NOT
    all queues addressed)
```

Note: if DSCH power control information is not available for UE j, the scheduler should assume the user lies at the cell edge, and use a $C/I_{max,j}$ value appropriate for such a user, either preprogrammed within the scheduler or updated in response to information obtained from DSCH power control (the scheduler would maintain the minimum value of $C/I_{max,j}$ of all UEs served).

It should be noted that the $C/I_{TFC}$ values may be fixed (and preprogrammed into the scheduler) or updated continuously according to measurements made by UEs.

Thus, in the example, an effective scheduling in response to the power requirement determined from the DSCH is achieved and thus the scheduler may control the allocation of power resource to FACH data and e.g. to different UEs.

In some embodiments, it may be advantageous to group UEs such that UEs with similar power requirements share a transmission. In this way the transmission power may be suited for all (or most) of the UEs served.

Figure 6:
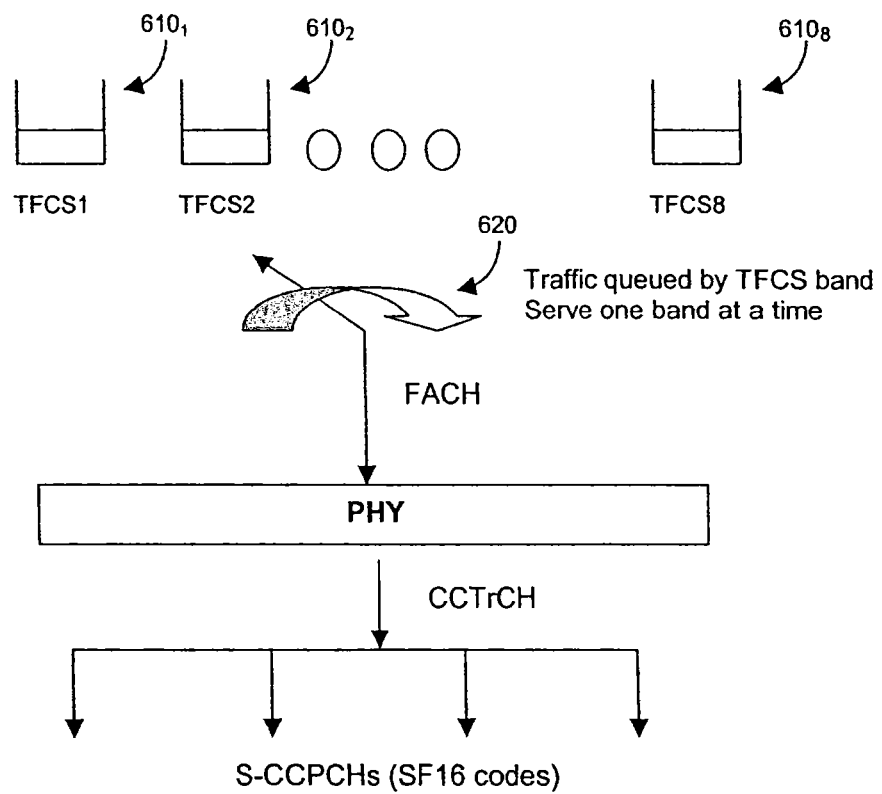
FIG. 6 shows a schematic diagram illustrating traffic queued by Transport Format Combination Set (TFCS) band and served one band at a time.

Specifically, if the FACH CCTrCH is configured to support a number of UEs in the same transmission, it is advantageous to serve UEs with approximately the same $C/I_{max,j}$ at the same time, since the worst-case $C/I_{max,j}$ assumed by the scheduler, as discussed above. The $C/I_{max,j}$ may for example be considered in view of the TFCS (Transmit Format Combination Set) associated with transmissions to the UE. One embodiment that exploits this, for the case when there is a single FACH CCTrCH (n=1), is shown in FIG. 6. Here queue Q1 is subdivided into 8 subqueues, denoted TFCS1 to TFCS8 ($610_1$, $610_2 \ldots 610_8$), and users are placed in the subqueue which reflects their $C/I_{max,j}$ value. In this embodiment, these correspond to the TFCS banding or grouping employed (see below) such that UEs having similar power requirements (e.g. falling within the same specified interval) are allocated to the same subqueue. Different mechanisms for serving the subqueues can be employed; FIG. 5 illustrates a round-robin scheduler 620 that addresses a different subqueue for each transmission.

In another embodiment of the invention, suppose the usage of FACHs is as shown in FIG. 5; although, each CCTrCH is restricted to use two codes (not four, because of hardware limitations of the UE receiver). According to the UEs power requirements on the DSCH, a UE is banded (grouped) into different groups corresponding to a suitable transmit format (TFCS). The system may use eight different TFCS' from TFCS1 to TFCS8 and each TFCS may be used as a power requirement. Thus, if the DSCH evaluation indicates that a transmission to a UE matches the TFCS1 characteristics, the UE is allocated to the TFCS1 group, if the DSCH evaluation indicates that a transmission to a UE matches the TFCS2 characteristics, the UE is allocated to the TFCS2 group, etc.

Figure 7:
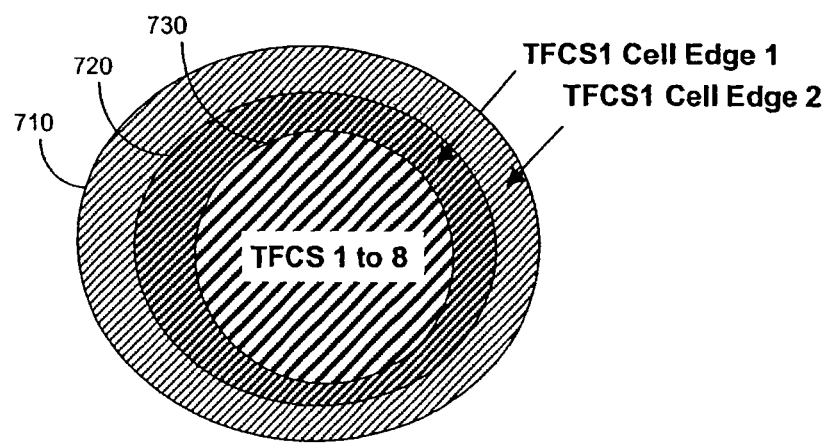
FIG. 7 shows a schematic diagram illustrating banding of UEs on the DSCH into different TFCSs.

In the example, each UE is thus allocated into one TFCS, from TFCS1 to TFCS8 (710), plus "TFCS1 cell edge 1" (720) and "TFCS1 cell edge 2" (730) bands, as shown in FIG. 7. Essentially, the different TFCSs from 1 to 8 express the channel coding rate that may be employed with a given transmit power to the UE, whilst attaining the required signal to noise ratio. For example, UEs near the cell centre experience low path loss and low interference; they are placed in TFCS8 which has a code rate close to unity (i.e., it has very little redundancy to protect against noise). In contrast, with TFCS1, used by UEs that are very close to the cell edge, the code rate is approximately ⅓—a lot more error protection is required at the cell edge. UEs that experience a C/I lower than the TFCS1 band are assigned to "TFCS1 cell edge 1", or "TFCS1 cell edge 2". In the cell edge 1 band a UE is given twice the power per code of a TFCS1 UE, and in cell edge 2 the UE is given four times the power per code. This is accomplished by limiting the number of codes used in a timeslot (compared to TFCS1, half the number of codes is used in cell edge 1 and a quarter of the number of codes is used in cell edge 2). The channel coding applied to the cell edge bands is identical to TFCS1. Power control of the DSCH is examined by the RNC, and decisions to switch a UE between TFCSs can then be made (as in published patent publication WO 03/049320). The TFCS in use is then used in determining the power consumption on the FACH when serving this UE (see below for details)—this is the 'power cost' introduced above. Consequently, the number of FACHs that may be scheduled is determined. For example, four UEs of band status from 1 to 8 may be served (on four FACHs, four S-CCPCH CCTrCHs), but if a cell edge 2 UE is to be served then only this UE may be served in this frame.

The power costs calculated are given in Table 1 below (for the case where 1 FACH is mapped to 2 S-CCPCH codes).

TABLE 1

| TFCS | FACH power cost |
|---|---|
| TFCS1 cell edge 2 | 1.00 |
| TFCS1 cell edge 1 | 0.50 |
| TFCS1 | 0.25 |
| TFCS2 | 0.25 |
| TFCS3 | 0.25 |
| TFCS4 | 0.25 |
| TFCS5 | 0.25 |
| TFCS6 | 0.25 |
| TFCS7 | 0.25 |
| TFCS8 | 0.25 |

Thus for each group a standard FACH power cost is allocated to each UE. The power cost is indicative of the resource required to transmit a data block to the UE.

It should be noted that when transmitting to users from any of the TFCS bands from 2 to 8, the same power cost as TFCS1 is assumed. A more sophisticated algorithm that adjusts the power cost across the complete TFCS range is described below.

The FACH scheduler may thus control the power used and allocated on the FACH by allocating FACH data in response to the resource usage associated with the transmission of the FACH data. For example, it may allocate FACH data until the combined total FACH power cost exceeds a given threshold.

Clearly the number of FACHs transmitted will now be variable since it will depend on the DSCH TFCS which is applied to the UEs to which the FACHs are to be sent. The MAC will be required to provide this scheduling and determine how many FACHs that can be let through to Layer 1 and be consequently be transmitted.

Figure 8:
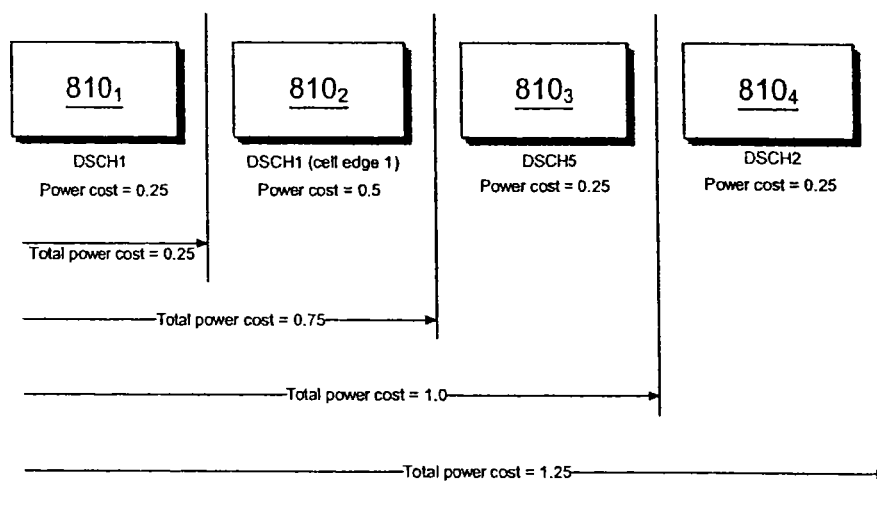
FIG. 8 shows a schematic diagram illustrating a FACH power cost scheme.

It is likely that at any one time FACHs will be needed to be transmitted to users which are on different DSCH TFCS and therefore a scheme will be employed in the MAC based on ratio of the total power available to the required power for each FACH (called a FACH power cost), as illustrated in FIG. 8, where four FACHs ($810_1$, $810_2$, $810_3$ and $810_4$) are to be transmitted.

All messages sent on the Common Control Channel (CCCH), or where the DSCH TFCS is not known, will have a FACH cost of 1.0.

An optional enhancement of some embodiments of the invention performs the power management under the assumption that the C/I should be met but not exceeded for users in different bands. In this enhancement, Table 1 may be revised as follows:

TABLE 2

| TFCS | FACH power cost |
|---|---|
| TFCS1 cell edge 2 | 1.00 |
| TFCS1 cell edge 1 | 0.50 |
| TFCS1 | 0.25 |
| TFCS2 | 0.19 |
| TFCS3 | 0.13 |
| TFCS4 | 0.09 |
| TFCS5 | 0.07 |
| TFCS6 | 0.05 |
| TFCS7 | 0.03 |
| TFCS8 | 0.01 |

When using Table 2, the FACH power control must ensure that the available FACH CCTrCH code resource is not exceeded as FACH blocks are added to the schedule. With Table 1 this is not necessary, since the minimum power cost of 0.25 ensures that at most four FACHs (which corresponds to 8 S-CCPCH codes) can be scheduled, which represents the code limitation of FACH CCTrCHs.

It will be understood that the present invention is not limited to FACH power determination based upon the method of TFCS selection described above. The FACH power may for example be estimated provided that indication of the DSCH power consumption is passed to the FACH scheduler, located within the RNC.

Under typical conditions, the FACH and DSCH timeslots are heavily loaded, and the C/I achievable in these slots is approximately equal. In such circumstances, the FACH power management scheme should work well. However, if the network is lightly loaded, either in FACH or DSCH slots, then the performance of the algorithm may be reduced. This may be improved by the RNC determining whether to use the power control algorithm based on DSCH operation (as described above) or a conventional measurement based calculation of the C/I achievable at the UE. In this way, the DSCH based algorithm may only be used if the loading on the DSCH in the neighbouring cells is high (the mean code consumption over a set of neighbour cells on the DSCH in the timeslots for which the UE has been granted DSCH resource over a predefined time period exceeds a threshold) and the immediate loading on the FACH is high in the neighbouring cells (determined using a threshold on the queued FACH traffic across the neighbour cells).

It will be understood that the method and apparatus for power control in a radio communication system described above provides a number of advantages including one or more of the following advantages:

maximisation of throughput on FACH(s).
  exploitation of DSCH power control mitigates or eliminates the need for additional measurements to be taken by the UE.
  the resource requirement may be reduced and thus the capacity of the communication system as a whole may be increased.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

Embodiments of the invention can be implemented in any suitable form including hardware, software, firmware or any combination of these. The invention may optionally be implemented at least partly as computer software running on one or more data processors and/or digital signal processors that read from memory instructions and data for implementing embodiments of the invention. In this document, the terms "computer program product" and "computer-readable medium" refer to any medium, e.g., memory, that may store instructions for implementing embodiments of the invention. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. A method for power control in a communication system employing a Downlink Shared Control Channel (DSCH) and a Forward Access Control Channel (FACH), comprising:
   applying power control on the Downlink Shared Control Channel; deriving power control information from the power control on the Downlink Shared Control Channel; and
   applying to the Forward Access Control Channel the derived power control information from the power control on the Downlink Shared Control Channel in order to produce power control on the Forward Access Control Channel in a case that loading on a DSCH in a neighboring cell exceeds a threshold value and loading on a FACH in the neighboring cell exceeds a threshold value, wherein
   applying power control information to the Forward Access Control Channel comprises grouping mobile stations with similar power requirements on a same Forward Access Control Channel.

2. The method of claim 1 wherein deriving power control information from the power control on the Downlink Shared Control Channel comprises deriving power control information from a radio network power control function.

3. The method of claim 1 wherein deriving power control information from the power control on the Downlink Shared Control Channel comprises deriving power control information from a base station power control function.

4. The method of claim 1 wherein deriving power control information from the power control on the Downlink Shared Control Channel comprises deriving power control information from transport format combination set selection.

5. The method of claim 1 wherein applying power control information to the Forward Access Control Channel comprises scheduling a plurality of Forward Access Control Channels in dependence on the derived power control information.

6. The method of claim 5 wherein scheduling comprises scheduling the plurality of Forward Access Control Channels based on a signal-to-interference difference power cost calculation.

7. The method of claim 5 wherein scheduling comprises scheduling the plurality of Forward Access Control Channels based on fixed signal/interference values.

8. The method of claim 6 wherein scheduling comprises scheduling the plurality of Forward Access Control Channels based on dynamically updated signal/interference values.

9. The method of claim 1 wherein applying power control information to the Forward Access Control Channel comprises queueing and serving of mobile stations with similar power requirements on a same Forward Access Control Channel at the same time.

10. The method of claim 1 wherein the step of applying power control information to the Forward Access Control Channel comprises grouping mobile stations with similar power requirements in a same scheduling interval of a same Forward Access Control Channel.

11. The method of claim 1 wherein the system is a time division duplex communication system.

12. The method of claim 1 wherein the system comprises a UMTS wireless system.

13. The method of claim 1 wherein the system comprises a 3GPP system.

14. An apparatus for power control in a communication system employing a Downlink Shared Control Channel (DSCH) and a Forward Access Control Channel (FACH), the apparatus comprising:
    circuitry configured to
        apply power control on the Downlink Shared Control Channel;
        derive power control information from the power control on the Downlink Shared Control Channel; and
        apply to the Forward Access Control Channel the derived power control information from the power control on the Downlink Shared Control Channel in order to produce power control on the Forward Access Control Channel in a case that loading on a DSCH in a neighboring cell exceeds a threshold value and loading on a FACH in the neighboring cell exceeds a threshold value, wherein
    applying power control information to the Forward Access Control Channel comprises grouping mobile stations with similar power requirements on a same Forward Access Control Channel.

15. The apparatus of claim 14 wherein the circuitry is configured to derive power control information from the power control on the Downlink Shared Control Channel by deriving power control information from a network power control function.

16. The apparatus of claim 14 wherein the circuitry is configured to derive power control information from the power control on the Downlink Shared Control Channel by deriving power control information from a base station power control function.

17. The apparatus of claim 14 wherein the circuitry is configured to derive power control information from the power control on the Downlink Shared Control Channel by deriving power control information from transport format combination set selection.

18. The apparatus of claim 14 wherein the circuitry is configured to apply power control information to the Forward Access Control Channel by scheduling a plurality of Forward Access Control Channels in dependence on the derived power control information.

19. The apparatus of claim 18 wherein the circuitry is configured to schedule the plurality of Forward Access Control Channels based on signal/interference difference power cost calculation.

* * * * *